United States Patent

Przybyła et al.

Patent Number: 4,656,719
Date of Patent: Apr. 14, 1987

[54] METHOD OF PREPARING BIMETALLIC TUBES FOR ROLL-FORMING RIBS

[75] Inventors: Janusz Przybyła, Zabkowice Bedzinskie; Zygmunt Gozdziewicz, Kedzierzyn-Kozle; Andrzej Szal, Kedzierzyn-Kozle; Ryszard Zub, Kedzierzyn-Kozle; Andrzej Maczynski, Gliwice, all of Poland

[73] Assignee: Zaklady Urzadzen Chemicznych Metalchem, Kedzierzyn-Kozle, Poland

[21] Appl. No.: 622,138

[22] Filed: Jun. 19, 1984

[51] Int. Cl.$^4$ .................. B21D 39/00; B23P 11/00
[52] U.S. Cl. ............................. 29/516; 29/520
[58] Field of Search ............... 29/505, 506, 508, 511, 29/520, 516, 459

[56] References Cited

U.S. PATENT DOCUMENTS

| 1,960,042 | 5/1934 | Andrus | 29/459 |
| 3,239,931 | 3/1966 | Guarnaschelli | 29/516 |
| 3,461,523 | 8/1969 | Peehs et al. | 29/516 |
| 4,125,924 | 11/1978 | Goetze et al. | 29/520 |
| 4,400,862 | 8/1983 | Ignell | 29/511 |
| 4,403,385 | 10/1983 | Kirk | 29/516 |

Primary Examiner—Howard N. Goldberg
Assistant Examiner—Steven Nichols
Attorney, Agent, or Firm—Ladas & Parry

[57] ABSTRACT

A method of preparing bimetallic tubes or pipes for roll-forming ribs therefrom, in which the external tube is subjected to initial compressive stress is introduced, is characterized by roughening the ends of the internal tube, and after placing the internal tube in the external tube the ends of the external tube are clamped on the roughened segments of the internal tube with simultaneous axial displacement of a part of the material of the external tube corresponding to said compressive stresses of a required quantity. From the tube assembly thus prepared ribs are drawn. It is preferable that at least one end of the external tube is formed conically during clamping.

2 Claims, 1 Drawing Figure

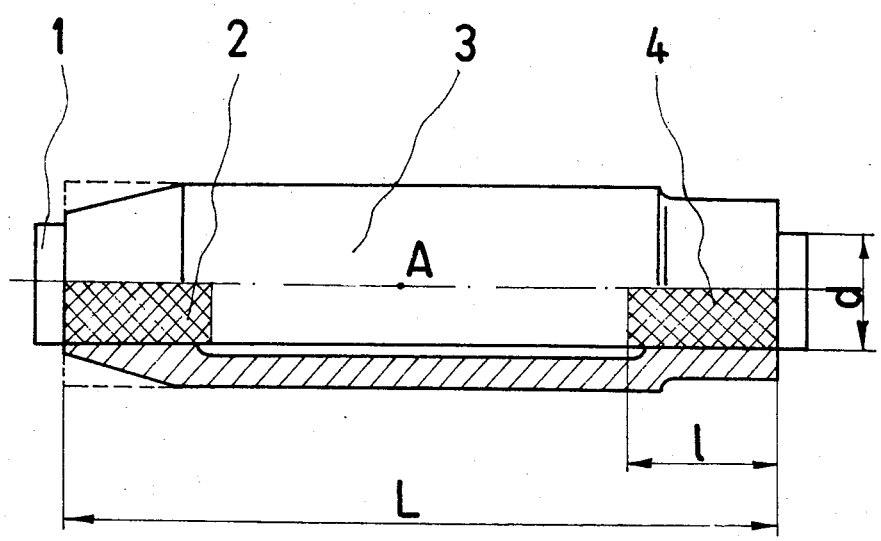

METHOD OF PREPARING BIMETALLIC TUBES FOR ROLL-FORMING RIBS

BACKGROUND OF THE INVENTION

The subject of the invention concerns a method of drawing ribs on bimetallic tubes, in which the ribs are drawn from an external tube into which initial compressive stress has been introduced.

Ribs on tubes are drawn by acting on the tube with rotary tools comprising roll-formed disks. From the Polish patent specification, application No. P-241323, a method of drawing ribs on tubes is known, in which before placing the tube in the zone of the action of disk tools initial compressive stress is introduced into the tube. In this way a discharge has been achieved during the operation of the tool from axial loads bending out the roll-formed disks practically from the first stage of the working contact of the tool with the tube. For the purpose of inducing compressive stresses in the tube in the application No. P-241323 a is provided.

In the case of drawing ribs on bimetallic tubes such a solution is practically useless because it is difficult to meet the requirement of accurately setting both tubes in relation to each other with simultaneous application of a compressive force on the external tube.

SUMMARY OF THE INVENTION

The essence of the method of preparing bimetallic tubes or pipes according to the invention, in which by the action of disk tools ribs from the external tube are drawn and to the external tube initial compressive stress is introduced, consists in that roughness of the external surface of the internal tube is increased along two segments, each of a length 1 of from 0.8 to 3 d, where d denotes the outer diameter of the internal tube, and the said segments are spaced from each other by a distance $L-(1.6-6)$ d, where L denotes the length of the external tube. Next, the internal tube is placed in the external tube so that the ends of the external tube are in line with the outer ends of the roughened segments of the internal tube. Next, the ends of the external tube are clamped to the inner tube over a length of from 0.5 to 1.5 of the length of the roughened segments, with a simultaneous axial displacement of the deformed volume of the material of the external tube in the direction of center of the tube. The axial deformation has a quantity corresponding to compressive stresses applied to the material of the external tube. Next, assembled tubes are placed in the zone of the action of roll-forming tools and ribs are drawn on the external tube. It is preferable to form during clamping at least one end of the external tube in a conical shape.

The method according to the invention enables a durable connection of the external tube with the internal tube in an accurately established position of the ends of the tubes and permits introducing to the external tube the necessary compressive stresses which facilitates rib-forming. An advantage of the method is also that the merged tubes during rolling do not displace in relation to each other, and elimination of the use of instruments for the maintenance of initial stresses in the tube reduces labor-consumption of operations in the production of ribbed bimetallic tubes. Moreover, production of ribbed bimetallic tubes by this method enables achieving considerable material savings in relation to so-called free rolling.

BRIEF DESCRIPTION OF THE DRAWING

The subject of the invention will be now explained in more detail in the drawing presenting a bimetallic tube assembly with introduced initial compressive stress, prepared for drawing ribs.

DESCRIPTION OF A PREFERRED EMBODIMENT

A bimetallic tube consists of an internal tube 1 and an external tube 2. At selected distances from the ends of the internal tube 1 there are segments 3 and 4 of the surface of the tube of increased roughness. The increase of roughness can be effected, for example, by knurling, grooving or threading. The length l of the segment of increased roughness is from 0.8 to 3 of the diameter d of the internal tube. At least one of the deformed ends of the external tube 2 is deformed so that a part of the deformed end of the tube is displaced in the axial direction, towards the center A of the external tube 2. The axially displaced material of the external tube 2 corresponds to the desired deformation to be induced by introducing compressive stresses necessary for drawing the ribs.

What is claimed is:

1. In a method of preparing bimetallic pipes for roll-forming ribs from the external surface thereof, comprising the steps of: introducing an inner pipe into an outer pipe to form a bimetallic assembly, subjecting the assembly to initial compression stresses, and then forming ribs on the outer pipe by the action of rotary roller tools, the improvements which are characterized in that, before introducing the inner pipe into the outer pipe, the external surface of the inner pipe is roughed over at two sections, one at each end, each roughened section having a length $1=(0.8-3)$ d, where d is the outer diameter of the inner pipe, said sections being spaced from each other by a distance $L=(1.6-6)$ d, where L is the length of outer pipe, the inner pipe is then introduced into the outer pipe so that the ends of the outer pipe are aligned with the roughened ends of the inner pipe, and then the ends of the outer pipe are clamped on the inner pipe over a distance from about 0.5-1.5 times the length of said roughened sections of the inner pipe, and simultaneously axially displacing parts of the outer pipe towards the middle of the pipe assembly, the magnitude of which corresponds to said compression stresses set up in the material of the outer pipe to enable forming said ribs.

2. A method as defined in claim 1, characterized in that at least one end of the outer pipe is conically formed while being clamped on the inner pipe.

* * * * *